US012174964B2

(12) United States Patent
Tseng et al.

(10) Patent No.: US 12,174,964 B2
(45) Date of Patent: Dec. 24, 2024

(54) DYNAMIC ACCOUNT RISK ASSESSMENT FROM HETEROGENEOUS EVENTS

(71) Applicant: PINDROP SECURITY, INC., Atlanta, GA (US)

(72) Inventors: Hung Wei Tseng, Atlanta, GA (US); Kailash Patil, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 17/159,748

(22) Filed: Jan. 27, 2021

(65) Prior Publication Data

US 2021/0240837 A1  Aug. 5, 2021

Related U.S. Application Data

(60) Provisional application No. 62/969,954, filed on Feb. 4, 2020.

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01); *G06F 2201/835* (2013.01); *G06F 2201/86* (2013.01); *G06F 2221/034* (2013.01)

(58) Field of Classification Search
CPC ................. G06F 21/577; G06F 21/552; G06F 2201/835; G06F 2201/86; G06F 2221/034
See application file for complete search history.

(56) References Cited

U.S. PATENT DOCUMENTS

| 6,438,475 | B1* | 8/2002 | Gioutsos | B60R 21/01558 180/274 |
| 8,745,698 | B1* | 6/2014 | Ashfield | H04L 63/08 726/4 |
| 11,113,306 | B1* | 9/2021 | Breitman | G06Q 50/01 |

(Continued)

FOREIGN PATENT DOCUMENTS

WO   WO-2020164274 A1 *  8/2020

OTHER PUBLICATIONS

Jianguo Jiang • Song Li • Min Yu • Kai Chen • Chao Liu • Weiqing Huang • Gang Li; MRDroid: A Multi-act Classification Model for Android Malware Risk Assessment; 2018 IEEE 15th International Conference on Mobile Ad Hoc and Sensor Systems (MASS) (2018, pp. 64-72); (Year: 2018).*

(Continued)

*Primary Examiner* — Roderick Tolentino
*Assistant Examiner* — Chao Wang
(74) *Attorney, Agent, or Firm* — Foley & Lardner LLP (57) ABSTRACT

Embodiments described herein provide for performing a risk assessment. A computer identifies and stores heterogeneous events between a user and a provider system in which the user interacts with an account. The computer may store the heterogeneous events in a table. The stored event information normalizes the events associated with an account. The computer may determine static risk contributions associated with the event information of the account and store the static risk contributions in the table. The computer groups the static risk contributions into predetermined groups. The static risk contributions in each group are converted into dynamic risk contributions. The dynamic risk contributions of each group are aggregated, and the aggregate value of the dynamic risk contributions are fed to a machine learning model. The machine learning model determines a risk score associated with the account.

16 Claims, 7 Drawing Sheets

(56) References Cited

U.S. PATENT DOCUMENTS

| | | | | |
|---|---|---|---|---|
| 2007/0244778 | A1* | 10/2007 | Bailard | G06Q 40/02 |
| | | | | 705/35 |
| 2013/0159251 | A1* | 6/2013 | Skrenta | G06F 16/2282 |
| | | | | 707/612 |
| 2015/0026027 | A1 | 1/2015 | Priess et al. | |
| 2017/0111506 | A1* | 4/2017 | Strong | G06F 21/32 |
| 2018/0124110 | A1* | 5/2018 | Hunt | G06F 16/951 |
| 2018/0288063 | A1* | 10/2018 | Koottayi | G06F 21/50 |
| 2019/0037081 | A1 | 1/2019 | Rao et al. | |
| 2019/0342452 | A1 | 11/2019 | Strong et al. | |
| 2021/0131823 | A1* | 5/2021 | Giorgio | G06V 10/803 |

OTHER PUBLICATIONS

David De Lille • Bart Coppens • Daan Raman • Bjorn De Sutter; Automatically combining static malware detection techniques; 2015 10th International Conference on Malicious and Unwanted Software (MALWARE) (2015, pp. 48-55); (Year: 2015).*

Santanu Kumar Dash • Guillermo Suarez-Tangil • Salahuddin Khan • Kimberly Tam • Mansour Ahmadi • Johannes Kinder • Lorenzo Cavallaro; DroidScribe: Classifying Android Malware Based on Runtime Behavior; 2016 IEEE Security and Privacy Workshops (SPW) (2016, pp. 252-261); (Year: 2016).*

International Search Report and Written Opinion for PCT Appl. Ser. No. PCT/US2021/015239 dated Apr. 12, 2021 (9 pages).

International Preliminary Report on Patentability for PCT Appl. Ser. No. PCT/US2021/015239 dated Aug. 18, 2022 (7 pages).

Examination Report No. 1 on Australia App. Serial No. 2021216997, dated Feb. 16, 2023 (5 pages).

First Examiner's Requisition on CA App. 3,166,258 dated Aug. 3, 2023 (5 pages).

Extended European Search Report on EPO App. 21750003.2 dated Jan. 19, 2024 (10 pages).

* cited by examiner

| Event ID 502 | Account ID 504 | Timestamp 506 | Static Risk Contributions 508 |
|---|---|---|---|
| 1 _514a_ | A | 1/18/17 at 10:00 a.m. | Risk_group1: [0.5, 1.9] _510_<br>Risk_group2: [4.0] |
| 2 | B | 1/20/18 at 10:00 p.m. | Risk_group1: [3.0] |
| 3 _514b_ | A | 1/18/18 at 3:00 p.m. | Risk_group1: [0.3] _512_<br>Risk_group2: [4.0] |

DYNAMIC ACCOUNT RISK ASSESSMENT FROM HETEROGENEOUS EVENTS

CROSS-REFERENCE TO RELATED APPLICATIONS

This application claims priority to U.S. Provisional Application No. 62/969,954, filed Feb. 4, 2020, which is incorporated by reference in its entirety.

TECHNICAL FIELD

This application generally relates to systems and methods for dynamically assessing the riskiness of an account from heterogeneous events.

BACKGROUND

A user may interact with their account using various channels of a provider, such as visiting a physical provider location, calling the provider, using the internet to access the provider's website, or interacting with the provider's smartphone application. Each channel may have unique risks and challenges that must be overcome with respect to fraud detection. In an example, a user may use the Internet to access their account. One common security verification technique to verify/authenticate the user is an evaluation of the user device's IP address and a determination of whether that IP address is associated with the user. Although the IP address may be instructive or contribute beneficially to some authentication technologies, the IP address could be manipulated using virtual private networks (VPNs) or other software. As such, more dynamic and circumspect techniques are needed to confidently authenticate the user for any given channel.

Such dynamic and stronger authentication techniques are particularly critical in systems that allow users to access user accounts through any number of channels. But this can result in complexities, too. The challenges faced with respect to one channel are not the same as the challenges faced with respect to the other channels. Each channel includes security hardware and software that performs dedicated risk assessment operations and outputs authentication results that are idiosyncratic to the particular channel. These conventional technologies determine the risk associated with a particular channel. But these conventional technologies are limited in that conventional technologies cannot detect risk across the channels. This would beneficially reduce the time needed to determine risk, reduce the amount of data traffic, simplify data analytics processing, increase confidence in overall results (e.g., risk scores, authentication/verification determinations), and offer a more generalized insight into the day-to-day risk posed to particular accounts. As such, there remains a desire to assess a fraud risk across any number of channels and regardless of the type of channels.

SUMMARY

Disclosed herein are systems and methods capable of addressing the above-described shortcomings and may provide any number of additional or alternative benefits and advantages. Embodiments described herein provide for determining a risk scores for accounts across multiple channels. An analytics system trains and executes a machine-learning model that performs risk assessments on static and dynamic risk contributions that are identified from event data values gathered during account access events. The static risk contributions represent various types of risk or risk features that are generally unchanged by, for example, time, channels, or other aspects of the account access event. Dynamic risk contributions represent various types of risk or risk features that might decay over time or vary based on the aspects of the account access event. The events are heterogeneous in that the events could arise through any number of channels, and could vary in other aspects as well.

The analytics system assesses the risk associated with an account using information extracted across the various channels capable of accessing the account. The analytics system may consolidate the information from each of the channels and determine a risk score of the account. The analytics system assesses the risk of an account across events on various channels by assessing a timeline of the user's account access events.

In an embodiment, a computer-implemented method for account risk assessment comprises obtaining, by a computer, event data for one or more events to access a user account by one or more user devices via one or more channels, wherein the one or more channels include at least one telephony channel, the event data for each event including a set of risk contributions associated with communications from a user device via a channel of the one or more channels; applying, by the computer, a machine-learning model to the set of risk contributions associated with the one or more channels, the machine-learning model trained on a plurality of training account features corresponding to one or more training risk contributions for generating an account risk score; and generating, by the computer, the account risk score for the user account associated with the one or more events via the one or more channels based upon applying the machine-learning model to the set of risk contributions.

In another embodiment, a system comprises a non-transitory storage medium configured to store computer program instructions; and a computing device comprising a processor that, when executing computer program instructions, is configured to: extract event data for one or more events to access a user account by one or more user devices via one or more channels, the event data for each event including a set of risk contributions associated with communications from a user device via a channel of the one or more channels, wherein the one or more channels include at least one telephony channel; apply a machine-learning model to the set of risk contributions, the machine-learning model trained on a plurality of training account features corresponding to one or more training risk contributions for generating an account risk score; and generate the account risk score for the user account associated with the one or more events via the one or more channels based upon applying the machine-learning model to the set of risk contributions.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are within the scope of the invention.

Embodiments described herein provide for systems and methods for account risk assessment. With the advancement of technology, accounts can be accessed by users in multiple ways through various channels. Each instance that the user attempts to access the user account, a computing device (e.g., analytics server) evaluates identifies an "event" associated with the user's interaction and corresponding attempt to access the user account. The computing device then extracts event information captured during the interaction. Each event may be considered heterogeneous because each event may be associated with various available channels available for accessing the user account. The channel associated with the event determines the characteristics (e.g., format, data type) of stored event information. For example, when the user operates a mobile device to interact with a service provider's system through a telephony channel, the event data is stored into a database, which includes an audio file. As another example, when the user operates a computing device to interact with the provider's system through a TCP/IP channel, the event data is stored into the database, which includes a text data file. An analytics server calculates static risk contributions that are used for assessing a risk for an account that is agnostic of the particular events and channels.

The analytics server may identify events associated with various accounts. Based on the identified event information, the analytics server may extract static risk contributions associated with each event. The analytics server may store the event and associated information (including static risk contributions) in a unified event table. While the events, channels, and providers may have unique data formats, the unified event table normalizes the events such that the information used in determining the risk assessment score associated with each account is stored in a single location.

The analytics server may determine a risk score associated with each account based on the information from all of the events associated with that account. The analytics server converts the risks at the time of the event (e.g., the static risk contributions) into dynamic risk contributions because the risk associated with the event, at the time of the event, may have decayed over time. The analytics server groups risk contributions into a predetermined number of groups and aggregates the values in the group. The aggregated group values are fed into a machine learning model to determine the risk score associated with the account. The machine-learning model may utilize various types of the machine-learning algorithms, such as neural networks, logistic regression models, and the like.

A. Components and Operations of Illustrative Systems

Figure 1:
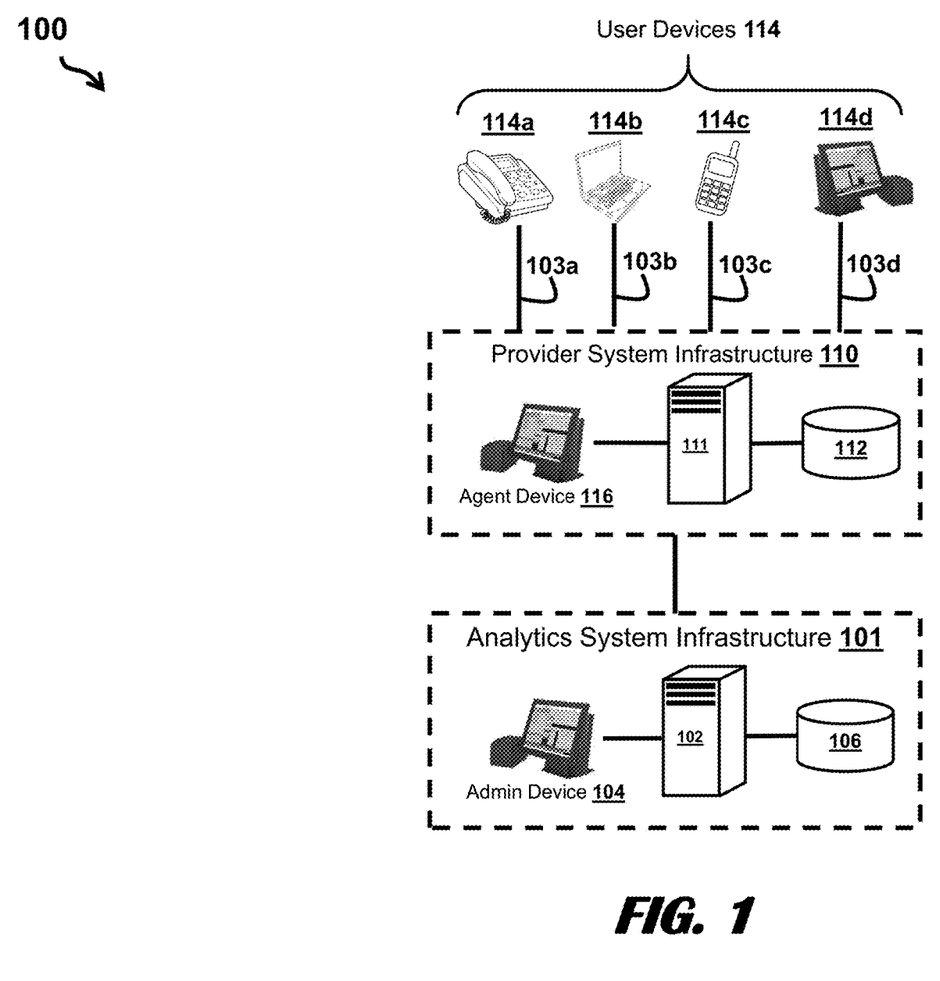
FIG. 1 shows components of a system for receiving and analyzing event information to determine a risk assessment associated with an account, according to an embodiment.

FIG. 1 shows components of a system 100 for receiving and analyzing event information to determine a risk assessment associated with an account, according to an embodiment. The system 100 comprises an analytics system infrastructure 101, provider system infrastructure 110, and user devices 114 (e.g., landline phone 114a, computing device 114b, mobile phone 114c, provider location device 114d) via channels 103a-103d (collectively referred to as channels 103). The provider system infrastructure 110 includes various hardware and software components to support a provider's service (e.g., financial institution services, retail services, insurance services) offered to users. The users may have one or more accounts associated with the provider.

Embodiments may comprise additional or alternative components or omit certain components from what is shown in FIG. 1, yet still fall within the scope of this disclosure. It may be common, for example, for the system 100 to include multiple provider system infrastructures 110 or for the analytics system infrastructures 101 to have multiple analytics servers 102. Embodiments may include or otherwise implement any number of devices capable of performing the various features and tasks described herein. For example, the FIG. 1 shows the analytics server 102 as a distinct computing device from the analytics database 106. In some configurations, the analytics database 106 may be integrated into the analytics server 102, such that these features are integrated within a single device.

A user intending to access an account associated with the provider system infrastructure 110 may use various user devices 114 to interact with the provider system infrastructure 110 and request access to account data, which may be stored in one or more databases 106, 112. Each user device 114 facilitates interactions for exchanging data or instructions between the provider system infrastructure 110 and the user device 114, allowing the user to access the user account and communicate with the components of the provider system infrastructure 110. An account access event results from the user's interaction and is identified by an analytics server 102. Various types of event information is extracted from the data exchange and stored into the one or more databases 106, 112 when the user attempts to access the user account. The interaction and resulting event data involves the user and the user's account in the provider system infrastructure 110 via one or more channels 103.

For example, the user may interact with the provider system infrastructure 110 by calling the provider using a landline phone 114a. The landline channel 103a associated with the landline phone 114a may include telephony and telecommunications protocols, hardware, and software capable of hosting, transporting, and exchanging audio data associated with telephone calls. Non-limiting examples of telecommunications hardware include switches and trunks, among other additional or alternative hardware used for hosting, routing, or managing telephone calls, circuits, and signaling. Non-limiting examples of software and protocols for telecommunications include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

In a different example, the user may interact with the provider system infrastructure 110 by navigating to a provider website using a computing device 114b. Channel 103b associated with the computing device 114b may include hardware and software components of one or more public or private networks. Non-limiting examples of such networks include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

In a different example, the user may interact with the provider system infrastructure 110 by calling the provider using a mobile phone 114c. Channel 103c associated with the mobile phone 114c may include aspects of channels 103a and 103b individually, or some combination of channels 103a and 103b.

In a different example, the user may interact with the provider system infrastructure 110 by physically visiting a physical or brick-and-mortar installation of the provider (e.g., bank branch, retail store). In this example, an agent-user (e.g., employee of the provider) operates a provider device 114d to interact with the provider system infrastructure 110 on behalf of the user. The agent of the provider may access the user's account information via the agent device 116 as part of the provider system infrastructure 110. The provider device 114d may be any electronic device, such as devices similar to the landline phone 114a, the computing device 114b, or the mobile device 114c, or could be any other electronic device capable of performing the processes and tasks described herein. The channel 103d may including any combination of hardware and software components capable of hosting and conducting communications and data exchanges, such as computing networks and/or telecommunications networks.

The provider system infrastructure 110 includes provider server 111, provider database 112, and agent device 116. Provider server 111, provider database 112 and agent device 116 may each include or be hosted on any number of computing devices comprising a processor and software and capable of performing various processes described herein.

An enterprise organization (e.g., corporation, government entity) may be a customer of the analytics service and operates the provider system infrastructure 110. In operation, the provider system infrastructure 110 receives information from an interaction with user devices 114 via the channel 103. For instance, channel 103a conveys interaction information associated with the landline phone 114a, channel 103b conveys interaction information associated with the computing device 114b, channel 103c conveys interaction information associated with the mobile phone 114c, and channel 103d conveys interaction information associated with the provider device 114d. The user interacts with the provider system infrastructure 110 to access the user account, where the user device's 114 interaction with the provider system infrastructure 110 includes the various data, which is stored as the account access event. The event information includes various types of data received from the user devices 114, devices of the service provider infrastructure 110, or extracted from the communications conducted over the channel 103. The event data may include various types of data or metadata, such as data related to the account access event, the channel 103 used to for conducting the account access event, the timestamp of the event, and the account associated with the event, DTMF tones, user data inputs, audio recording of a call.

The provider system infrastructure 110 may determine a risk assessment associated with the event. For example, the provider server 111, or other downstream application, may determine the risk associated with the user interacting with the provider website (e.g., channel 103b) using computing device 114b. The provider server 111 may store the determined risk assessment. The provider server 111 may store each of the events (and risk assessments) based on the event.

The provider server 111 may also forward the event information to the analytics server infrastructure 101 such that the analytics server 102 may determine the risk assessment and/or additional event information (e.g., extract the static risk contributions from the event information). The analytics system infrastructure 101 may perform the risk assessment on behalf of a provider system infrastructure 110. The transmission of the event information to the analytics server 102 may not disrupt the processes of the provider (e.g., the analytics server 102 may not require any changes to the provider's storage solutions, risk assessment data, and/or applications).

For example, the provider system infrastructure 110 may be a bank. The bank system infrastructure 110 forwards the event information associated with the user devices 114 to the analytics system infrastructure 101, which in turn performs various processes using the event information, such as determining static risk contributions, creating and/or updating a unified event table of interactions related to the user account, converting the static risk contributions to dynamic risk contributions, calculating aggregate dynamic risk contributions, and applying a risk assessment model, which may be any type of machine-learning model (e.g., neural network, logistic regression).

The provider server 111 of the provider system infrastructure 110 executes software processes for managing user interactions and/or routing interactions. For instance, call interactions, such as calls performed using a landline phone 114c and/or mobile phone 114c on channels 103a and 103c respectively, may be routed to appropriate provider agent service devices 116 based on the users comments. Additionally or alternatively, the provider server 111 may respond to website queries via computing devices 114b on channel 103b. In some cases, the user may work with an agent in person, where the agent operates a provider device 114d to access the user account via channel 103d. The provider server 111 can capture, query, or generate various types of information about the event, account, user, and channel and forward the information to the agent device 116, where a GUI on the agent device 116 is then displayed to the provider agent. The provider server 111 transmits the event information to the provider system infrastructure 110 and/or the analytics server 102 to preform various analytics processes.

Additionally or alternatively, the analytics system infrastructure 101 may interface with the user. In response to an event (e.g., the user's interaction with the analytics system infrastructure 101 via a user device 114 on a channel 103), the analytics system infrastructure 101 may forward the event information to the provider system infrastructure 110 such that the provider system infrastructure 110 may determine a risk score associated with the event, store the event information and/or risk score, use the risk score and/or event information in a downstream application, and the like.

The analytics system infrastructure 101 and the provider system infrastructure 110 are network system infrastructures 101, 110 comprising physically and/or logically related collections of software and electronic devices managed or operated by various enterprise organizations. The devices of each network system infrastructure 101, 110 are configured to provide the intended services of the particular enterprise organization. The analytics system infrastructure 101 includes analytics server 102, analytics database 106, and admin device 104.

The analytics system infrastructure 101 is operated by an analytics service that provides various interaction management, security (e.g., fraud detection) and analytics services to provider organizations (e.g., corporate call centers, government entities, financial institutions, retailors, insurance providers). Components of the analytics system infrastructure 101, such as the analytics server 102, execute various processes using information extracted from the interactions with user devices 114 via channels 103. In operation, a user interacts with their account using one or more user devices 114 via channels 103. As an example, the user may interact with the provider system infrastructure 110 directly. For instance, the user may call a bank to withdraw money from their savings account. The bank agent (or an interactive voice response (IVR)) may log the transaction information such as the account accessed, the time and date of the transaction, the requested withdrawal, a recording of the call, the user's phone number, and the like. As another example, the user may walk into a bank and speak with a bank agent, where the bank agent operates the provider device 114d to access the account data via channel 103d. The bank agent may record, generate, and/or transmit event information using the provider device 114d. The provider system infrastructure 110 may perform one or more operations to determine a risk assessment associated with the interaction based on the user device 114 used during the interaction. The provider system infrastructure 110 also transmits in real-time the risk assessment and/or the event information associated with the account access event to the analytics system infrastructure 101. The analytics system infrastructure 101 performs various analytics and downstream risk assessment operations.

Generally, when the user interacts with the provider system infrastructure 110 via a channel 103, the provider system infrastructure 110 may connect (via a computing device of the provider system infrastructure 110 such as a provider server 111, or agent device 116) information associated with the user interacting with the provider system infrastructure 110 to the analytics system infrastructure 101.

The analytics server 102 of the analytics system infrastructure 101 may be any computing device comprising one or more processors and software capable of performing the various processes and tasks described herein. The analytics server 102 may host or be in communication with the analytics database 106, and receive and process the interaction data from the provider system infrastructure 110. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. In some configurations, functions of the analytics server 102 may be partly or entirely performed by the computing devices of the provider system infrastructure 110 (e.g., the provider server 111).

In operation, the analytics server 102 may execute various software-based processes on the event information including: determining static risk contributions, creating and/or updating a unified event table of events related to an account, converting the static risk contributions to dynamic risk contributions of each event, calculating aggregate dynamic risk contributions, and applying the risk assessment model. In particular, the analytics server 102 may execute the risk assessment model (or any other a machine-learning model) to assess the risk associated with the accounts of the provider system infrastructure 110. The machine-learning model dynamically assesses the riskiness of an account in real time by evaluating the current day risk associated with the heterogeneous events.

The analytics server 102 extracts one or more static risk contributions from each of the events associated with an account. The static risk contributions are the risks associated with the event the day the user interacted with the account and created the event. The analytics server 102 may group the static risk contributions into groups based on similar characteristics of the static risk contributions (e.g., high risk contributions associated with the event, low risk contributions associated with the event, the forgetting factor).

The analytics server 102 may store all of the event information in a unified event table. The unified event table stores account information and event information associated with the accounts. In operation, the analytics server 102 receives event information or interfaces directly with a user to identify event information. For each event, the analytics server 102 extracts static risk contributions and updates the unified event table. The analytics server 102 updates the unified event table by adding a row to the table with the corresponding event information.

The analytics server 102 may determine a risk assessment (e.g., a risk score) associated with each account by retrieving event information in the unified event table. The analytics server 102 converts the groups of static risk contributions stored in the unified event table into groups of dynamic risk contributions by applying each static risk contribution in a group of static risk contributions to a time factor. The analytics server 102 uses the time factor to consider the time between the event and the performance of the risk assessment. The analytics server 102 may apply the groups of static risk contributions to various time factors with various parameters.

The analytics server 102 may adaptively modify the parameters. For example, the analytics server 102 may determine an optimal decay factor, used in the time factor to convert a static risk contribution to a dynamic risk contribution. The analytics server 102 may convert static risk contributions into dynamic risk contributions for each decay factor in a list of decay factors. The analytics server 102 may determine the risk assessment score for each decay factor. The analytics server 102 may compare the risk assessment scores to known risk assessment scores to select a decay factor that resulted in a risk assessment score closes to the known risk assessment score. Additionally or alternatively, the user may select the decay factor.

The analytics server 102 may aggregate the dynamic risk contributions in each of the groups. In operation, the aggregation transforms a vector of dynamic risk contributions associated with each group into an integer. There may be one integer for each group of dynamic risk contributions. The analytics server 102 may apply the integers to a machine learning model as a vector with dimension equal to the number of groups.

The analytics server 102 may train the machine learning model. The analytics server 102 trains the machine learning model using training account features, where the training account features are the vectors of dynamic risk contributions associated with each account. Examples of machine learning models that the analytics server 102 may employ include logistic regression, random forest, or deep learning. The analytics server 102 may perform cross validation (e.g., k-fold cross validation, exhaustive cross validation) to ensure the fitness of the model (e.g., the model is not overfit or underfit).

The analytics server 102 may store training account features in one or more corpora that the analytics server 102 references during training. The analytics server 102 may receive training data (e.g., the training static risk contributions, training dynamic risk contributions, training account features) from various corpora. The training data is associated with a label indicating the known risk assessment score for the particular account. The analytics server 102 references these labels to determine a level of error during training. The analytics server 102 feeds the training account features to the machine learning model, which the machine learning model uses to generate a predicted output (e.g., predicted risk assessment score) by applying the current model on the training event features.

The analytics server 102 references and compares the label associated with the training account features (e.g., expected risk assessment score) against the predicted risk assessment score generated by the current state of the machine learning model to determine the amount of error or differences. The analytics server 102 may tune the machine learning model to reduce the amount of error, thereby minimizing the differences between (or otherwise converging) the predicted output and the expected output.

The training data is stored with the labels representing the reported (or otherwise known) risk score associated with the account. The reported risk associated with the account may be determined by investigation agencies and/or the provider system infrastructure 110.

The risk assessment score may indicate the likelihood of fraud, or otherwise be used in downstream fraud detection applications. For example, the analytics server 102 may perform a downstream fraud detection operation to determine whether the risk assessment score has exceeded a fraud threshold. The risk assessment score exceeding the fraud threshold may be indicative of a "high risk account." That is, there may be a high likelihood of fraudulent activity associated with the account.

In the event that risk assessment score has exceeded the fraud threshold the analytics server may trigger an action. For instance, the analytics server may generate and transmit a notification to one or more users (e.g., provider agents) to conduct a review of the account.

In a different example, the analytics server 102 may periodically generate a list of the top risky accounts, where the top risky accounts are based on the risk assessment scores of each of the accounts. The analytics server 102 may monitor these accounts, transmit a notification such that one or more users (e.g., agent devices 116, admin devices 104) monitor the account, and the like.

The analytics database 106 and/or the provider database 112 may store information about the user, event information, and account information. The information about the user may include the user's name, a number of alternate authorized users, the user's geographic location, and the like. As discussed herein, the account information may vary depending on the provider. For instance, a provider may be a financial institution with the account being the checking account, savings account, credit card account, and the like. Additionally or alternatively, the provider may be a retailer with the account being a transaction. Additionally or alternatively, the provider may be an insurance provider with the account being the insurance policy. Depending on the provider, the provider database 112 may store different account information.

The analytics server 102 may query the analytics database 106 when executing the machine learning model and/or when executing one or more downstream operations. For instance, the analytics database 106 may store the risk assessment score of various accounts. The analytics server 102 may also reference the analytics database 106 during training when the analytics server 102 compares a generated risk assessment score to the stored risk assessment score.

The admin device 104 of the analytics system infrastructure 101 is a computing device allowing personnel of the analytics system infrastructure 101 to perform various administrative tasks or user-prompted analytics operations. The admin device 104 may be any computing device comprising a processor and software, and capable of performing the various tasks and processes described herein. Non-limiting examples of the admin device 104 include a server, personal computer, laptop computer, tablet computer, or the like. In operation, an admin employs the admin device 104 to configure the operations of the various components of analytics system infrastructure 101 or provider system infrastructure 110 and to issue queries and instructions to such components.

The agent device 116 of the provider system infrastructure 110 may allow agents or other users of the provider system infrastructure 110 to configure operations of devices of the provider system infrastructure 110. For interactions interfacing directly with the provider system infrastructure 110, the agent device 116 receives and displays some or all of the relevant information associated with the interaction routed from the provider server 111. Additionally or alternatively, provider agents may operate agent devices 116 to access the user's account as a user interacts with the agent.

B. Illustrative Method for Determining a Risk Assessment

Figure 2:
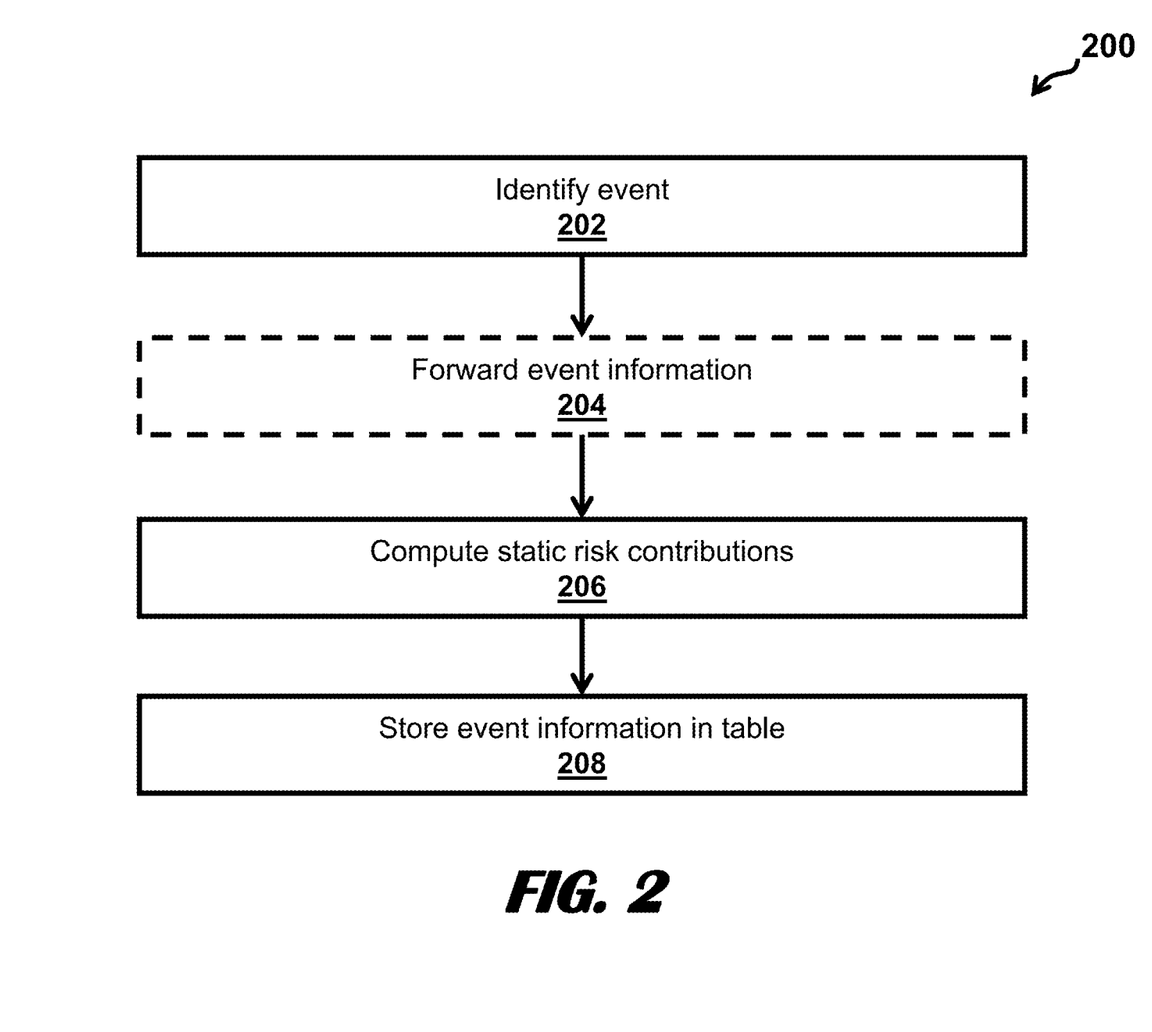
FIG. 2 shows execution steps for a method of extracting static risk contributions from events, according to an embodiment.

FIG. 2 shows execution steps of a method 200 for extracting static risk contributions from events, according to an embodiment. The method 200 is described below as being performed by a server executing machine-readable software code. Some embodiments may include additional, fewer, or different operations than those described in the method 200 and shown in FIG. 2. The various operations of the method 200 may be performed by one or more processors executing of any number of computing devices.

In step 202, the analytics server may identify an event. The analytics server may identify an event of an account access attempt based upon a user interacting with a user account (e.g., using a particular device and a particular channel). The interactions with the account are dependent on the channel used to interact with the account. For example, the user may attempt to access the account via an IVR system. The IVR system is a computer-based phone system that allows the user to access and modify their account without talking to a provider agent. Additionally or alternatively, the user accesses the account via a smartphone app, a website, and the like. The interactions with the account are also dependent on the provider of the account because various providers have different types of "accounts."

In an example, the provider of the user account may be a financial institution. The account associated with the financial institution may be checking accounts, saving accounts, credit card accounts, mortgage and/or loan information, and the like. The analytics server may identify an event each time the user accesses the account. Table 1 shows examples of various types of events, related event information, and potential channels for the events identified by the analytics server in response to user account access event with the financial institution.

TABLE 1

Example Events and Event Descriptions of a Financial Institution

| Event Name | Event Description |
|---|---|
| IVR Access Log | The analytics server may log each IVR call. The IVR Access Log may include the timestamp, account accessed, operation performed, and the like. |
| Call Center Phone Record | The analytics server may record each instance the user talks to an agent of the financial institution. The call center phone record may include audio records, the operations performed during the call, the account accessed, and the like. |
| Online Access Log | The analytics server may log each time a user accesses the financial institution's website and/or smartphone application. The Online Access Log may include the timestamp, account accessed, operations performed using the website and/or application, and the like. |
| Physical Visit | The analytics server may record each time the user interacts via a physical branch of the financial institution. A Physical Visit record may include the timestamp, account accessed, operations performed during the physical visit, and the like. |
| Existing Risk Mitigation Solutions | A provider server (e.g., the server at the financial institution), may assess the risk associated with an account. The analytics server may record the risk assessment of the account according to the financial institution's risk mitigation solutions. |

In another example, the provider of the user account may be a retailer. An "account" associated with the retailer may be the transaction itself. A retailer may associate a transaction ID with each transaction that uniquely identifies the transaction activity. Table 2 shows examples of account access events identified by the analytics server in response to user interactions with the retailer.

TABLE 2

Example Events and Event Descriptions of a Retailer

| Event Name | Event Description |
|---|---|
| Transaction Log | The analytics server may log every transaction of the retailer. The log may include the timestamp of the transaction, the products involved in the transaction, the prices of the products involved in the transaction, transaction method (e.g., in store, online, via app), payment method (e.g., cash, credit card), and the like. |
| Call Center Phone Record | The analytics server may record each time the user talks to an agent of the retailer. For instance, a user may call the retailer's customer service number to request information about their transaction. The call center phone record may include audio records, transaction IDs, operations performed during the call, and the like. |
| Online Access Log | The analytics server may log each time the user accesses the retailer's website and/or smartphone application. The Online Access Log may include the timestamp, transaction |

TABLE 2-continued

Example Events and Event Descriptions of a Retailer

| Event Name | Event Description |
|---|---|
| | ID, operations performed using the website and/or application (e.g., whether the user is a first time purchaser and/or modifying the account), and the like. |

In another example, the provider of the user account may be an insurance provider. The "account" associated with the insurance provider may be the insurance policy, uniquely identifiable by an insurance policy number. For instance, a car insurance policy may include the vehicle identification number (VIN) number of the car, the driver's name and address, and the policy coverage. A health insurance policy may include the name of the policy holder, the policy validation date, the policy coverage details, and the like. Example events identified by the analytics server in response to user interactions with the insurance provider are described in Table 3 below.

TABLE 3

Example Events and Event Descriptions of an Insurance Provider

| Event Name | Event Description |
|---|---|
| Policy Creation | The analytics server may log information associated with the insurance policy such as the date the policy was signed, the policy holder's information, policy coverage details, and the like. |
| Claim Report | The analytics server may log information associated with claims seeking reimbursement. The information logged associated with the claim report may include the policy number, the description of the incident leading to the filing of the claim, supporting documents, and the like. |
| Call Center Phone Record | The analytics server may record each time the user talks to an agent of insurance provider. For instance, a user may call the insurance provider's customer service number to speak to an agent regarding their policy. The call center phone record may include audio records, the operations performed during the call, the policy ID, and the like. |
| Online Access Log | The analytics server may log each time a user accesses the insurance provider's website and/or smartphone application. The Online Access Log may include the timestamp, insurance policy accessed, operations performed using the website and/or application, and the like. |

Optionally, in step 204, the analytics server forwards the identified event to the provider database. The provider database may store the identified event and/or perform a risk assessment according to the provider's existing applications.

In step 206, the analytics server may compute the static risk contributions. The analytics server may extract one or more static risk contributions (e.g., a set of static risk contributions) from each of the events. Static risk contributions are numeric measures that indicate the risk that a particular event contributes to the risk of the overall account at the time of the event. A high static risk contribution may indicate that the risk associated with that event is high. The analytics server may extract static risk contributions based on both the nature of the event and the provider. Example static risk contributions extracted from the events described herein are shown in Tables 4-6 below.

TABLE 4

Example Events and Static Contributions of a Financial Institution

| Event Name | Static Contributions |
|---|---|
| IVR Access Log | Number of accounts accessed during the IVR<br>Balance of the financial account accessed<br>Risk score of the phone number communicating with the IVR<br>Number of days since the phone number has been registered to the account |
| Call Center Phone Record | Number of accounts accessed during the call<br>Balance of financial account accessed<br>Risk score of the phone number communicating with the call center<br>Risk score based on call audio analysis<br>Number of calls made from the same phone number previously<br>Determination of whether the timestamp of the call record is within the regular working time zone of the account holder |
| Online Access Log | Number of login attempts from the same Internet Protocol (IP) address or Media Access Control (MAC) address<br>Determine whether the MAC address or IP address have been used to access the account previously<br>Number of distinct accounts accessed by the IP address or MAC address<br>Number of high risk activities performed<br>"high risk" activities may be predetermined by one or more users (e.g., money transfers, changing contact information) |
| Physical Visit | Number of high risk activities performed<br>"high risk" activities may be predetermined by one or more users (e.g., money transfers, changing contact information)<br>Determine whether person has enough identity verification to verify the person's identity |
| Existing Risk Mitigation Solutions | Risk assessment received from financial institution |

TABLE 5

Example Events and Static Risk Contributions of a Retailer

| Event Name | Event Description |
|---|---|
| Transaction Log | Number of distinct products involved in the transaction<br>Number of the same products involved in the transaction<br>The total transaction amount<br>Determine whether credit card payment was used for the transaction<br>Determine whether quantity of products fall within regular personal usage (if personal transaction and not business transaction)<br>Determine whether the credit card bill address matches the shoppers' address<br>Determine whether the credit card holder's name matches the shopper's name |
| Call Center Phone Record | Number of transactions accessed during the call<br>Amount of transaction<br>Risk score of the phone number communicating with the call center<br>Risk score based on call audio analysis<br>Number of calls made from the same phone number previously<br>Determination of whether the timestamp of the call record is within the regular working time zone of the account holder |
| Online Access Log | Number of login attempts from the same Internet Protocol (IP) address or Media Access Control (MAC) address<br>Determine whether the MAC address or IP address have been used to access the transaction previously<br>Number of distinct transactions accessed by the IP address or MAC address<br>Number of high risk activities performed<br>"high risk" activities may be predetermined by one or more users (e.g., money transfers, changing contact information) |

TABLE 6

Example Events and Static Risk Contributions of an Insurance Provider

| Event Name | Event Description |
|---|---|
| Policy Creation | Number of fraudulent claims filed for this type of insurance policy<br>Value (or insured amount) of policy<br>Determine whether the insured amount is average with respect to the value of what is insured<br>Determine whether applicant has provided enough supporting documents when applicant applied for the policy |
| Claim Report | The difference in time between the time when the policy was created and the time when the claim was filed<br>Determine whether the claim was filed by the policyholder<br>Determine the number of claims that the claimant has filed previously<br>Determine whether policyholder is responsible for incident (e.g., for claims involving third party reports) |
| Call Center Phone Record | Number of insurance policies accessed during the call<br>Value (or insured amount) of policy<br>Risk score of the phone number communicating with the call center<br>Risk score based on call audio analysis<br>Number of calls made from the same phone number previously<br>Determination of whether the timestamp of the call record is within the regular working time zone of the account holder |
| Online Access Log | Number of login attempts from the same Internet Protocol (IP) address or Media Access Control (MAC) address<br>Determine whether the MAC address or IP address have been used to access the policy<br>Number of distinct accounts accessed by the IP address or MAC address<br>Number of high risk activities performed |

TABLE 6-continued

Example Events and Static Risk Contributions of an Insurance Provider

| Event Name | Event Description |
| --- | --- |
| | "high risk" activities may be predetermined by one or more users (e.g., money transfers, changing contact information) |

The analytics server may group the static risk contributions into predetermined groups. A user may predetermine the groups. Each event may have multiple groups. For instance, within each event, the analytics server may group the static risk contributions by the severity of the risks, the severity of the damage resulting from the risk (e.g., risk may result in serious damage), a forgetting factor (e.g., the risk contribution may not be important a year after the event has taken place), and the like. Within each event, and within each group, there may be various static risk contributions.

In step 208, the analytics server may store the event information in a table. The event information may include event metadata (e.g., the interaction associated with the event, the channel used to execute the event, the timestamp of the event, the account associated with the event, static risk contributions) and the event data itself (e.g., audio recordings of a call to an IVR).

Figure 3:
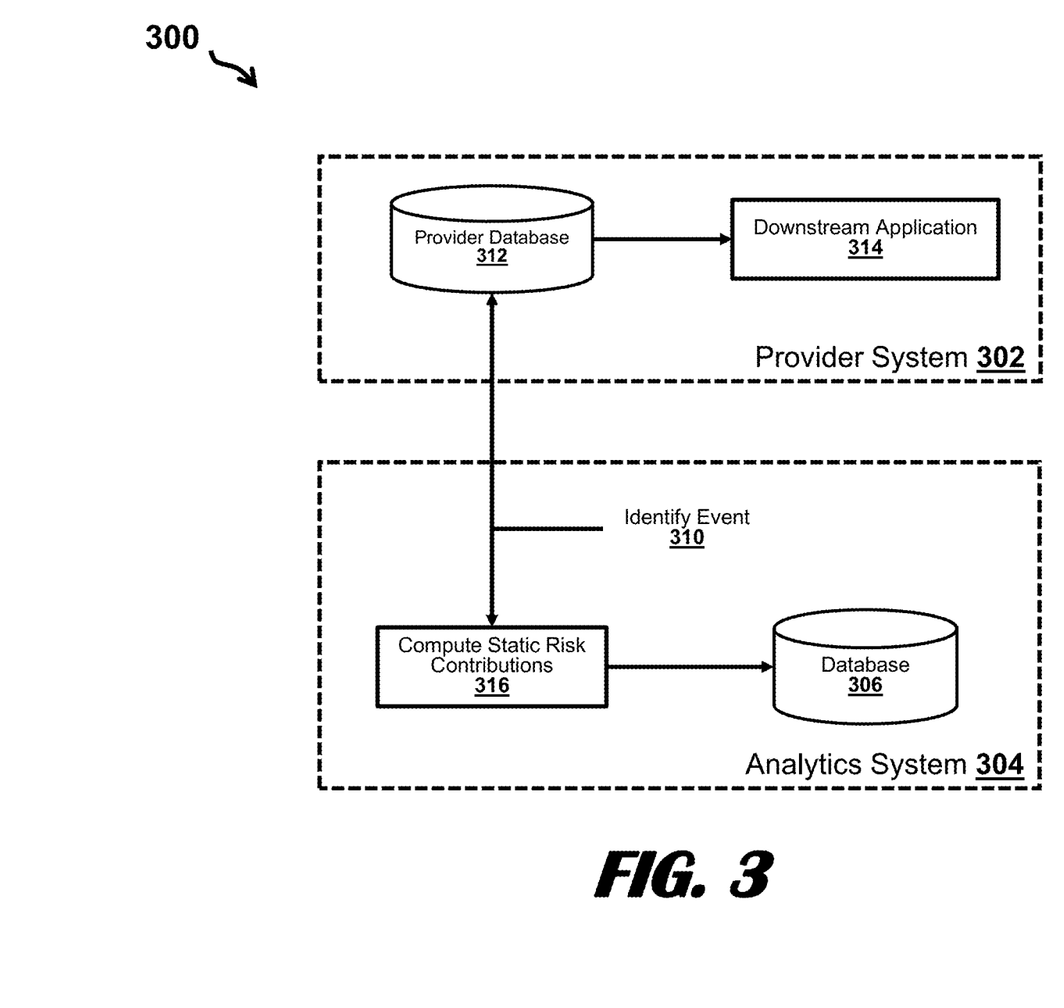
FIG. 3 shows extracting static risk contributions from an event, according to an embodiment.

FIG. 3 shows a system 300 for assessing account risk based on extracting static risk contributions from an event, according to an embodiment. The system 300 comprises an infrastructure of an analytics system 304 (e.g., analytics system infrastructure 101 in FIG. 1) and an infrastructure of a provider system 302 (e.g., provider system infrastructure 110 in FIG. 1), where the analytics system 304 includes an analytics server (e.g., analytics server 102 in FIG. 1) and performs operations shown in 304, and where the provider system 302 includes a provider server (e.g., provider server 111 in FIG. 1) and performs the operations shown in 302.

The analytics server may identify and extract information for an event 310 based on an account access attempt detected during an interaction between a user and the provider system 302. The analytics server transmits the event 310 information to the provider database 312. The provider database 312 receives and stores the event 310 information from the analytics server. A downstream application 314 may perform a risk assessment using the event information stored in the provider database 312 in addition to other information received from the provider database 312 or other third parties. The analytics server is not involved in the determination of the risk score by the downstream application 314 executed by the provider server in 302. The provider database 312 may forward the risk score to the analytics server.

In addition to identifying the event 310 and transmitting the event 310 information to the provider database 312, the analytics server may compute static risk contributions 316 from each event 310. As discussed herein, the analytics server may compute static risk contributions based on extracting risks from the event 310 information. The static risk contributions, in addition to the other event 310 information, may be sent to the database 306.

As discussed herein, the event 310 may be associated with a variety of interactions (via various channels and user devices). Because the events 310 are heterogeneous (e.g., depend on the channel associated with the event 310), the analytics server may identify and store event 310 information in various formats (e.g., audio files, text files). The analytics server normalizes the event 310 data associated with each of the events 310 by extracting information associated with each of the events 310 and storing the event 310 data in a unified format (e.g., the unified event table) in the database 306.

The analytics server generates and updates the dynamic unified event table in the database 306. The table may include each of the identified events 310 associated with an account. In some instances, there may be events associated with multiple accounts. For each event 310, the table may include information associated with the event 310, and the information may include an event ID, an account ID, a timestamp of the event 310, and a static risk contribution 316.

Figure 4:
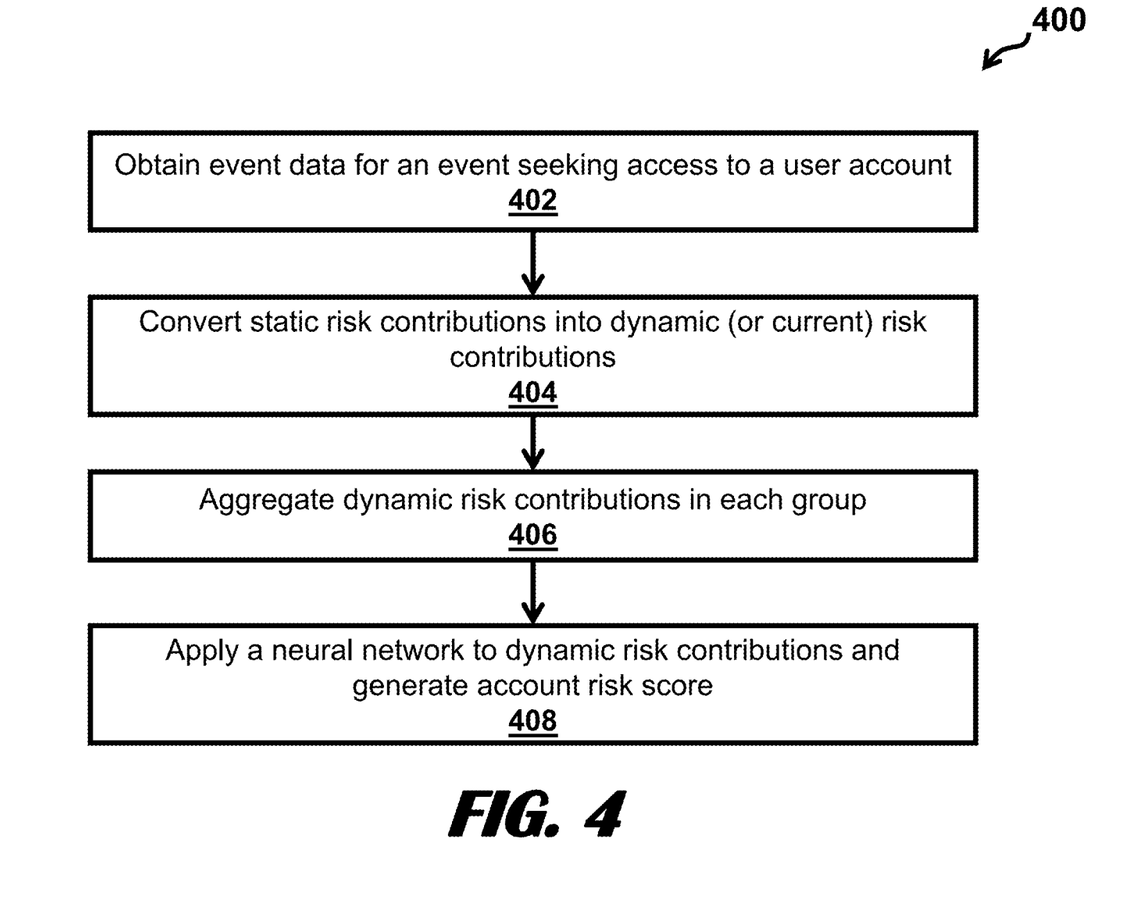
FIG. 4 shows execution steps for a method of performing an account risk assessment, according to an embodiment.

FIG. 4 shows execution steps for a method 400 of performing an account risk assessment, according to an embodiment. The method 400 is described below as being performed by a server executing machine-readable software code. Some embodiments may include additional, fewer, or different operations than those described in the method 400 and shown in FIG. 4. The various operations of the method 400 may be performed by one or more processors executing of any number of computing devices.

In step 402, the analytics server may receive or extract event data for each of the events seeking access to a user account (e.g., the account in which the risk is being assessed). The analytics server may receive or extract the event data for the events using the unified event table.

Figure 5:
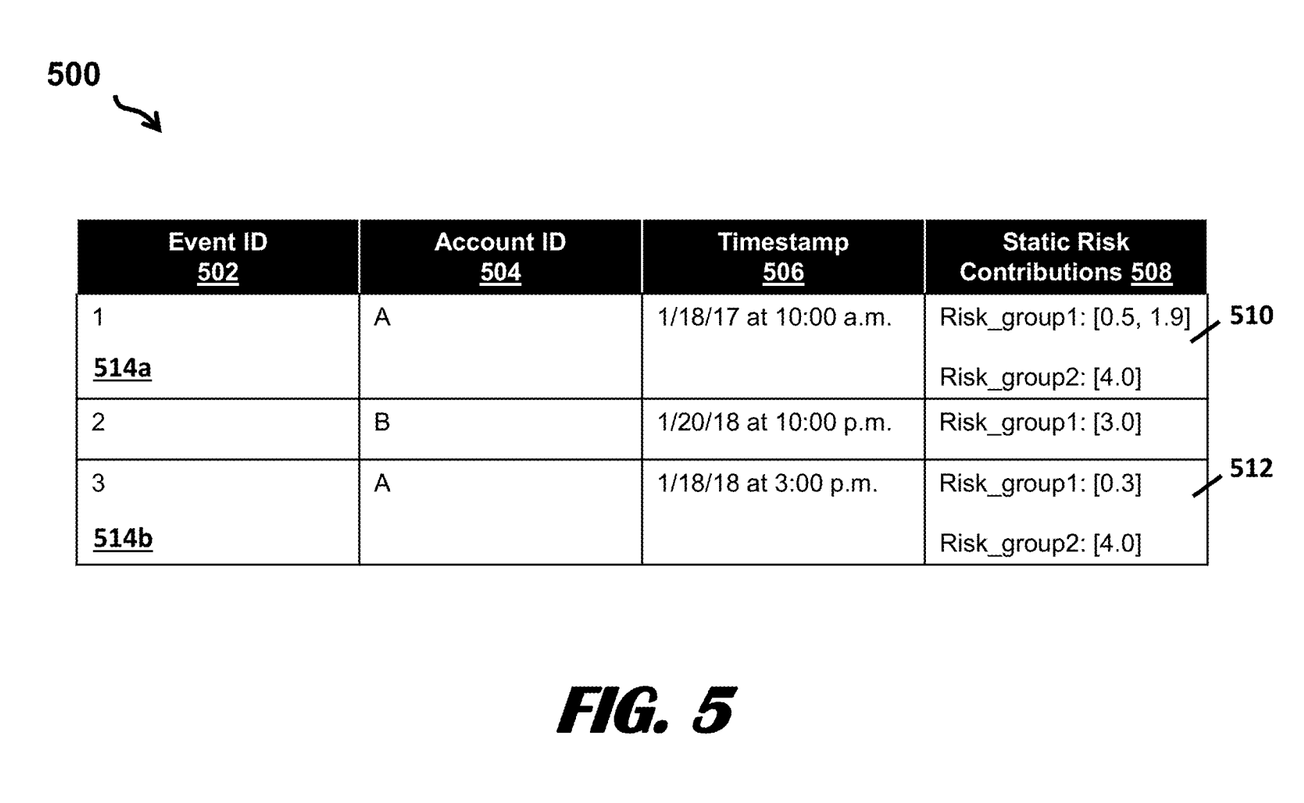
FIG. 5 shows a unified event table, according to an embodiment.

FIG. 5 shows a unified event table 500 according to an embodiment. Each of the rows of the unified event table includes event data for unique events that are heterogeneous across a variety of channels, types of data, and/or types of user devices. The unified event table need not store all possible channel information and/or event information because the unified event table may contain normalized data for the events. The normalization of the events allows the analytics server to assess the risk to each account in the table, regardless of the user device and/or channel that was used in the event. The columns of the unified event table may be event information. For example, column 502 indicates the unique event ID associated with the event, column 504 indicates the account ID, column 506 indicates the timestamp of the event (e.g., when the event identified in column 502 took place) and column 508 indicates the static risk contributions grouped into various risk groups. The risk group indicated by marker 510 may be the static risk contributions associated with high risk characteristics of the event. The risk group indicated by marker 512 may be the static risk contributions associated with low risk characteristics of the event.

The analytics server may perform a risk assessment associated with an account. The analytics server may retrieve each of the events associated with the account. For instance, the analytics server may retrieve events 514a and 514b to determine the risk associated with user account A.

Referring back to FIG. 4, in step 404, the analytics server converts the static risk contributions received from the unified event table (in step 402) into dynamic risk contributions (or current risk contributions). The analytics server will receive groups of static risk contributions associated with each event. The analytics server converts the groups of static risk contributions into dynamic risk contributions via one or more time factors. When an event occurs, the event is associated with a risk that the event is fraudulent (e.g., static risk contribution). The dynamic risk contribution is an indication of the current day risk associated with the event.

The analytics server converts the static risk contributions into dynamic risk contributions by considering the time gap between the event timestamp and the current timestamp. Each dynamic risk contribution becomes a feature of the event. Generally, the risk of fraud associated with events decreases over time. However, some events and/or accounts may be so risky (e.g., associated with a risky interaction over a risky channel) that the risk does not decay over time.

In a non-limiting example, the analytics server may take into account the time gap between the event timestamp and the current timestamp by applying the time gap to a time factors such as an exponential decay factor. Equation (1) below is an example of how the analytics server converts the static risk contribution to a dynamic risk contribution using an exponential decay factor.

$$\text{dyanmic risk contribution} = \left(\frac{1}{2}\right)^{\frac{time\_gap}{\lambda}} \times \text{static risk contribution} \quad (1)$$

In equation (1) above, the time gap is the gap between the event timestamp and the current timestamp, and λ is the decay factor. A user (or the analytics server adaptively) may determine the decay factor.

In operation, the duration of the time gap may be inversely proportional to the dynamic risk contribution. For instance, the analytics server may have determined that the static risk contribution for a particular event is 0.7. The analytics server may determine that the time between the timestamp of the event and the current timestamp is 1 day. In the example, the analytics server may determine the dynamic risk contribution to be 0.65. In contrast, for the same static risk contribution (e.g., 0.7), if the time gap is 14 days (e.g., the time between the timestamp of the event and the current timestamp), the dynamic risk contribution may be 0.3.

Additionally or alternatively, the analytics server may convert the static risk contributions into the dynamic risk contributions uniquely for each static risk contribution and/or each predetermined group. Similarly, there may be a unique decay factor for each static risk contribution and/or each predetermined group.

In step 406, the analytics server aggregates all of the dynamic risk contributions in each of the groups. Each group is a feature of the account. Applying a risk assessment model to the features of the account advantageously sets the dimensionality of the risk assessment model to the number of features (e.g., groups), while allowing the flexibility of adding events associated with the account. That is, the analytics server may add a new interaction associated with an account to the unified event table. The analytics server may extract, group, and convert the static risk contributions into the dynamic risk contributions in predefined groups. The predefined groups preclude the need to retrain the risk assessment model using a different dimension input because the inputs of the risk assessment model are based on the predefined groups. It should be appreciated that the risk assessment model may be any type of machine-learning model, such as a neural network or logistic regression.

In step 408, the analytics server applies the risk assessment model on, for example, the dynamic risk contributions to generate an account risk score. The analytics server may apply the risk assessment model on any number of features of the account (e.g., the dynamic risk contributions of each event grouped into predetermined groups). The risk assessment model generates and returns a risk assessment score for the user account. The higher the risk assessment score, the more likely the account is at a higher risk of fraud.

Each provider may define a "high risk" account uniquely. For example, a high risk account associated with a financial institution may indicate that the details of the account have been compromised (e.g., a credit card associated with an account has been stolen and may be being used fraudulently). In another example, a high risk account associated with a retailer may indicate that there is a high likelihood of a chargeback for the transaction. Chargeback occurs when a credit-card provider demands that the retailer cover the loss for a fraudulent or disputed transaction. For instance, a fraudster may steal a credit card and use it to buy products from a retailer. However, when the original credit card owner (e.g., the user) disputes the transaction with the credit card issuer, the credit card issuer can "chargeback" the retailer for the loss. In yet another example, a high risk account associated with an insurance provider may indicate that there is a high likelihood that there is (or will be) a claim aimed to defraud the insurance provider (e.g., a fraudulent claim).

Figure 6A:
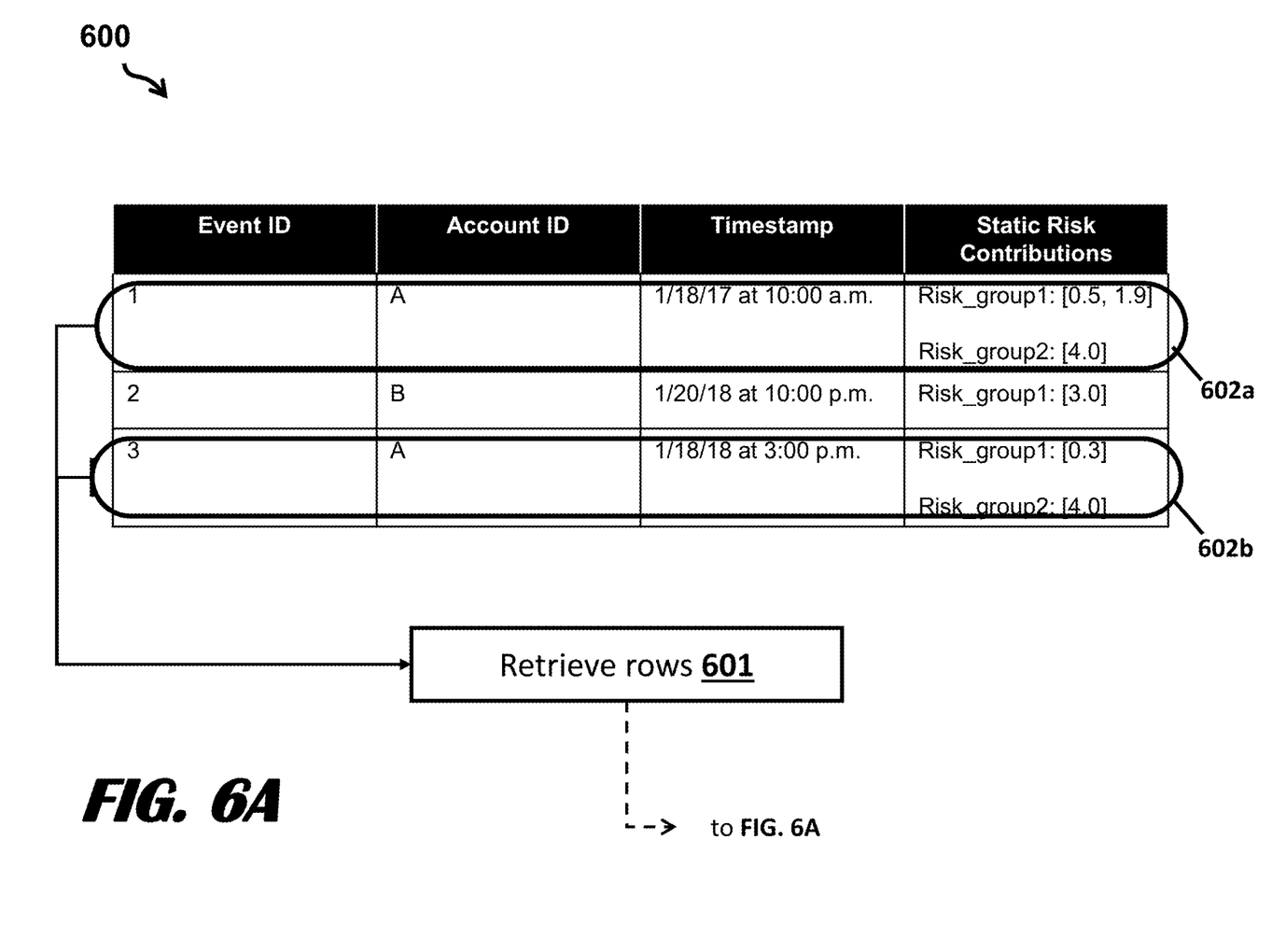
FIGS. 6A-6B show an example of performing an account risk assessment, according to an embodiment.
Figure 6B:
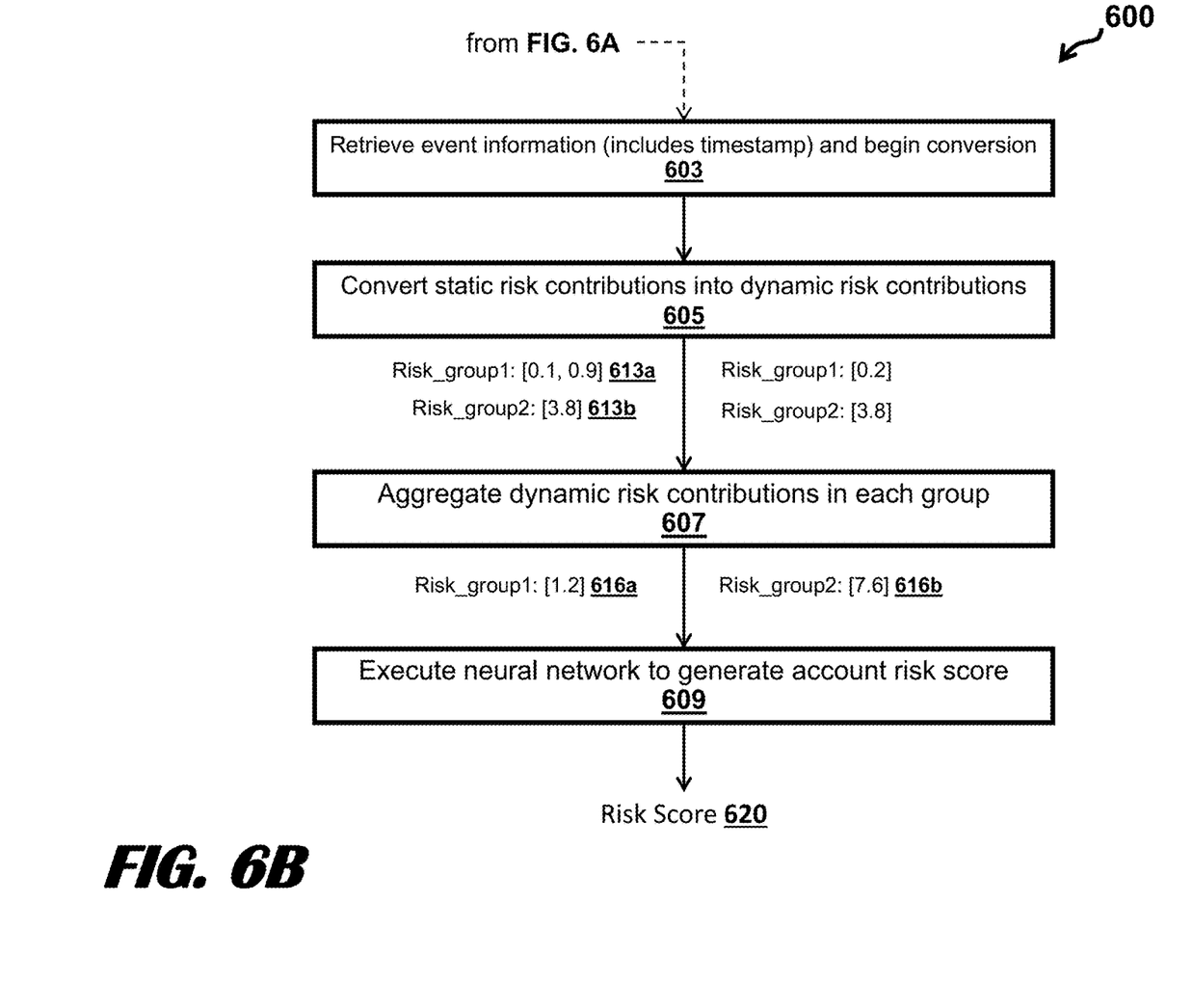

FIGS. 6A-6B show execution steps of a process 600 for performing an account risk assessment, according to an embodiment. In step 601, the analytics server retrieves event rows 602*a* and 602*b* to determine a risk score associated with account A.

In step 603, the analytics server retrieves the event rows 602*a* and 602*b* and begins a conversion operation on the event data to convert the event data into dynamic risk contributions. The conversion operations takes the data values of the retrieved event rows 602*a* and 602*b* and a current timestamp as inputs, and outputs the same risk groups, with the values of the risk groups converted into dynamic risk contributions.

In step 605, the analytics server coverts the static risk contributions into the dynamic risk contributions 613*a*, 613*b*. When the static risk contributions of risk group 1 associated with event 602*a* are converted into dynamic risk contributions 613*a*, the values in risk group 1 decrease significantly (e.g., static contribution values of 0.5 and 1.9 converted to dynamic risk contributions values of 0.1 and 0.9). The decrease in the risk contributions indicates that over time, the risk is less significant (e.g., becomes less risky). When the static risk contributions of risk group 2 associated with event 602*b* are converted (in step 605) to dynamic risk contributions 613*b*, the value in risk group 2 does not decrease significantly (e.g., static contribution values of 4.0 converted to dynamic risk contributions values of 3.8). The decrease in the risk contributions indicates that over time, the risk may still be significant.

In step 607, the analytics server aggregates the dynamic risk contributions of the risk groups. For instance, the sum of risk group 1 (e.g., the risk group associated with event 602*a* and 602*b*) is 1.2 616*a*. The sum of risk group 2 (e.g., the risk group associated with event 602*a* and 602*b*) is 7.6 616*b*. In step 609, the analytics server feeds the values of each risk group 616*a*, 616*b* into a machine learning model. The machine learning model outputs a present-day risk score 620 associated with the account. The risk score may be used by the system for authentication or fraud detection.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for account risk assessment, the method comprising:
   training, by the computer, a machine-learning model for generating an account risk score by executing the machine-learning model using a plurality of training feature vectors of a plurality of training risk contributions for a plurality of training account features;
   obtaining, by a computer, event data for a plurality of events to access a user account by one or more user devices via a plurality of channels, wherein the plurality of channels include at least one telephony channel and at least one computing channel, the event data for each event including a plurality of account features corresponding to a first set of risk contributions associated with communications from a user device via a channel of the plurality of channels;
   extracting, by the computer, using the event data originated via the plurality channels from the one or more user devices, a second set of risk contributions as a feature vector representing the plurality of account features, the second set of risk contributions converted from the first set of risk contributions extracted for the plurality of channels, wherein a risk contribution of the second set of risk contributions was converted based on a forgetting factor;
   generating, by the computer, the account risk score for the user account associated with the plurality of events via the plurality of channels based upon applying the machine-learning model to the feature vector representing the second set of risk contributions; and
   utilizing the risk score for user authentication or fraud detection.

2. The method according to claim 1, further comprising grouping, by the computer, the first set of risk contributions into one or more groups.

3. The method according to claim 2, further comprising aggregating, by the computer, the first set of risk contributions of each of the one or more groups.

4. The method according to claim 1, further comprising, before applying the machine-learning model, converting, by the computer, each first set of risk contributions to the corresponding second set of risk contributions based upon at least a timestamp associated with each event.

5. The method according to claim 4, wherein converting the first set of risk contributions includes modifying, by the computer, the first set of risk contributions according to a difference between a time of the event and a time that the computer converts the first set of risk contributions to the second set of risk contributions.

6. The method according to claim 1, further comprising applying, by the computer, the forgetting factor to the first set of risk contributions for converting to the second set of risk contributions.

7. The method according to claim 6, wherein the forgetting factor is an exponential decay factor.

8. The method according to claim 1, further comprising:
grouping, by the computer, the second set of risk contributions into one or more groups; and
aggregating, by the computer, the first set of risk contributions and the second set of risk contributions of each of the one or more groups.

9. A system comprising:
a non-transitory storage medium configured to store computer program instructions; and
a computing device comprising a processor that, when executing computer program instructions, is configured to:
train a machine-learning model for generating an account risk score by executing the machine-learning model using a plurality of training feature vectors of a plurality of training risk contributions for a plurality of training account features;
extract event data for a plurality of events to access a user account by one or more user devices via a plurality of channels, the event data for each event including a plurality of account features corresponding to a first set of risk contributions associated with communications from a user device via a channel of the plurality of channels, wherein the plurality of channels include at least one telephony channel and at least one computing channel;
extract, using the event data originated via the plurality channels from the one or more user devices, a second set of risk contributions as a feature vector representing the plurality of account features, the second set of risk contributions converted from the first set of risk contributions extracted for the plurality of channels, wherein a risk contribution of the second set of risk contributions was converted based on a forgetting factor;
generate the account risk score for the user account associated with the plurality of events via the plurality of channels based upon applying the machine-learning model to the second set of risk contributions; and
utilize the account risk score for user authentication or fraud detection.

10. The system according to claim 9, wherein the computer is further configured to group the first set of risk contributions into one or more groups.

11. The system according to claim 10, wherein the computer is further configured to aggregate the first set of risk contributions of each of the one or more groups.

12. The system according to claim 9, wherein the computer is further configured to, before applying the machine-learning model, convert each first set of risk contributions to the corresponding second set of risk contributions based upon at least a timestamp associated with each event.

13. The system according to claim 12, wherein the computer converts according to a difference between a time of the event and a time that the computer converts the first set of risk contributions to the second set of risk contributions.

14. The system according to claim 12, wherein the computer is further configured to apply the forgetting factor to the first set of risk contributions for converting to the second set of risk contributions.

15. The system according to claim 14, wherein the forgetting factor is an exponential decay factor.

16. The system according to claim 9, wherein the computer is further configured to:
group the second set of risk contributions into one or more groups; and
aggregate the set of risk contributions and the second set of risk contributions of each of the one or more groups.

* * * * *